United States Patent [19]

Haritonidis et al.

[11] Patent Number: 4,942,767

[45] Date of Patent: Jul. 24, 1990

[54] PRESSURE TRANSDUCER APPARATUS

[75] Inventors: Joseph H. Haritonidis, Brookline; Stephen D. Senturia, Boston; David J. Warkentin; Mehran Mehregany, both of Cambridge, all of Mass.

[73] Assignee: Massachusetts Institute of Technology, Cambridge, Mass.

[21] Appl. No.: 360,325

[22] Filed: Jun. 2, 1989

Related U.S. Application Data

[63] Continuation-in-part of Ser. No. 932,780, Nov. 19, 1986.

[51] Int. Cl.[5] .......... G01D 5/34; G01L 7/08; G01L 9/00

[52] U.S. Cl. .......... 73/705; 250/231.19; 250/227.27; 356/358

[58] Field of Search .......... 73/705, 723, 753; 250/231 P, 231 R, 226; 356/352, 357, 358; 29/569 L

[56] References Cited

U.S. PATENT DOCUMENTS

| | | | |
|---|---|---|---|
| 3,040,583 | 6/1962 | Post | 73/705 |
| 4,158,310 | 6/1979 | Chih-Ming Ho | 73/705 |
| 4,408,123 | 10/1983 | Sichling et al. | 250/231 R |
| 4,589,286 | 5/1986 | Berthold, III | 73/705 |
| 4,678,902 | 7/1987 | Perlin | 73/705 |
| 4,678,909 | 7/1987 | Jackson e al. | 73/705 |
| 4,682,500 | 7/1987 | Kazutaka | 73/705 |
| 4,711,246 | 12/1987 | Alderson | 73/705 |

FOREIGN PATENT DOCUMENTS

| | | | |
|---|---|---|---|
| 85302195.4 | 10/1985 | European Pat. Off. . | |
| 86301450.2 | 10/1986 | European Pat. Off. . | |
| 1584048 | 2/1981 | United Kingdom . | |
| 8132263 | 5/1982 | United Kingdom . | |
| WO86/07445 | 12/1986 | World Int. Prop. O. | 250/231 D |

*Primary Examiner*—Donald O. Woodiel
*Attorney, Agent, or Firm*—Hamilton, Brook, Smith & Reynolds

[57] ABSTRACT

A micromachined diaphragm is positioned across a gap from an end of an optic fiber. The optic fiber and the diaphragm are integrally mounted. The end of the optic fiber provides a local reference plane which splits light carried through the fiber toward the diaphragm. The light is split into a transmitted part which is subsequently reflected from the diaphragm, and a locally reflected part which interferes with the subsequently diaphragm reflected part. The interference of the two reflective parts forms an interference light pattern carried back through the fiber to a light detector. The interference pattern provides an indication of diaphragm deflection as a function of applied pressure across the exposed side of the diaphragm. A detection of magnitude and direction of diaphragm deflection is provided by use of a second fiber positioned across the gap from the diaphragm. The second fiber provides an interference pattern in the same manner as the first fiber but with a phase shift. An opening allowing communication between ambient and the gap enables use of the interferometer sensor as a shear stress measuring device.

6 Claims, 3 Drawing Sheets

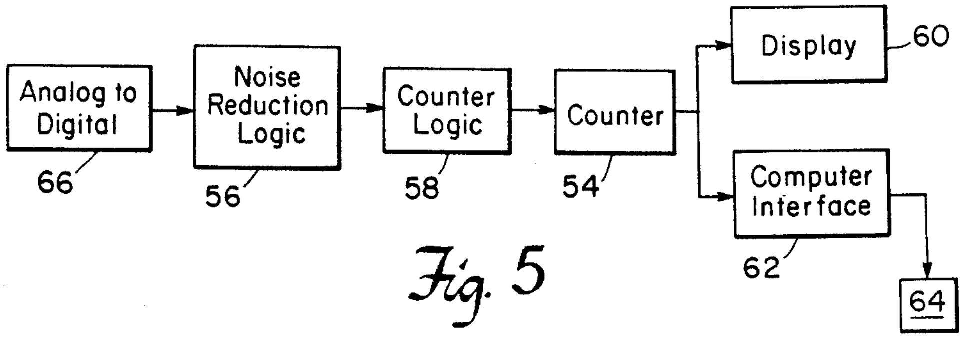
Fig. 5
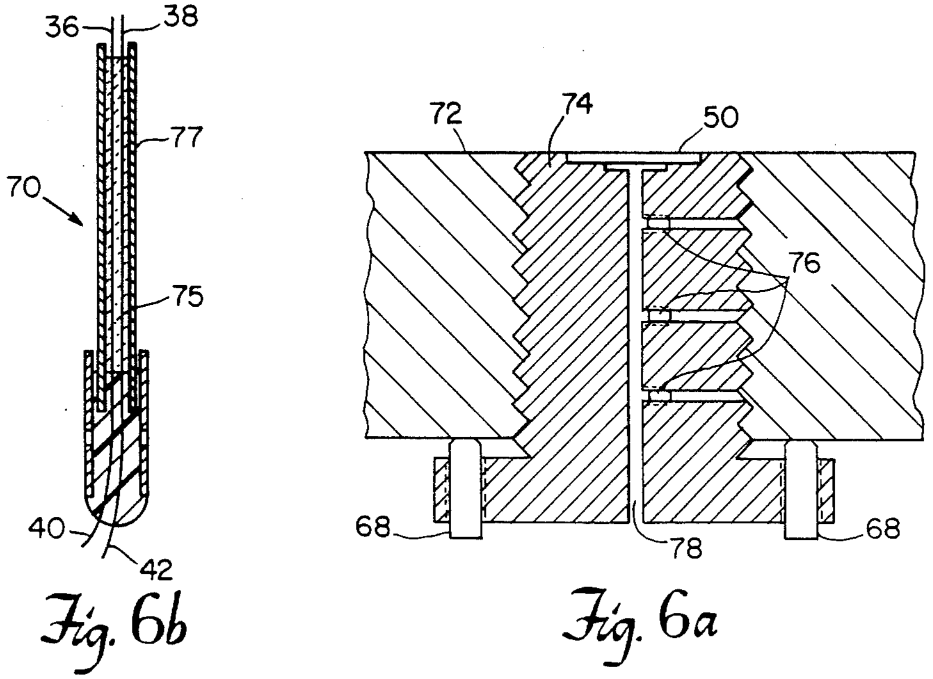
Fig. 6b
Fig. 6a
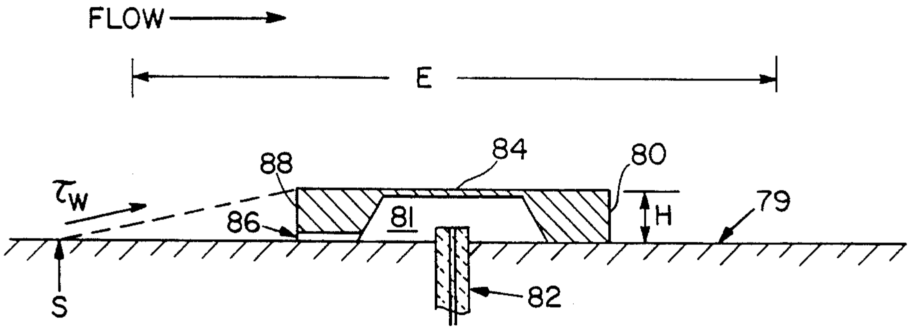
Fig. 7

PRESSURE TRANSDUCER APPARATUS

Related Applications

The following is a continuation-in-part of U.S. Pat. application Ser. No. 06/932,780 filed on Nov. 19, 1986 and assigned to the assignee of the present invention. That application is herein incorporated by reference.

Background of the Invention

The sensing of a pressure difference is important in the operations of many systems such as microphones, static pressure gauges and shear stress measuring devices. Flexible diaphragms in combination with various readout schemes have been used to detect pressure difference across the diaphragm. Pressure difference across a flexible diaphragm causes the diaphragm to deform. The readout scheme measures this deformation as a function of applied load and thereby provides a measurement of the sensed pressure difference.

Typical readout schemes involve a piezoresistive array in the diaphragm, or a movable plate capacitor associated with a fixed plate, or fiber optics. One disadvantage with electronic and capacitor schemes is that they are temperature sensitive and cannot be exposed to hostile environments.

In the case of shear stress measuring devices, measured pressure can be directly related to wall shear stress. Typically, pressure is transmitted from the area of a target wall to a remote location for determination of magnitude with respect to known pressures. However, the overall structure of flow over a wall comprises both a mean and fluctuating part of shear stress. The mean value determines the drag characteristics of a particular flow configuration, while the fluctuating part is of importance in sound generation, separated flows, passive or active control of turbulence and in general, assessment of which types of flow structures are primarily responsible for momentum transfer between the outer part of the boundary layer in turbulent flow and the wall. Further, non-lateral fluctuating forces, such as environmental pressures and eddies, affect the measuring of wall shear. It is known that many shear stress measuring devices which directly relate measured pressure to wall shear stress are not suitable for the measurements of fluctuating shear stress.

For example, a Stanton tube measures shear stress by employing a protruding member connected to one end of a tubing and a pressure transducer connected to the opposite end of the tubing remotely located from the target flow. The protruding member is positioned in the target flow in a manner that protrudes just above the wall on which shear stress is to be detected. An opening through the protruding member faces upstream into the target flow and enables fluid communication to the one end of the tubing. Pressures from the target flow are transmitted by the tubing from the opening of the protruding member to the pressure transducer. The pressure measurement produced by the pressure transducer is directly related to wall shear stress. However any fluctuations in pressure from the target flow are also transmitted by the tubing from the opening to the pressure transducer. Such fluctuations and any asymmetries in inner diameter of the tubing along the length of the tubing (e.g. at joints or connectors) cause a pumping force to be experienced by the pressure transducer. As a result, an accurate pressure measurement, and hence shear stress measurement, can not be obtained. Further the Stanton tube is not useable in a type of flow (laminar versus turbulent) for which it is not calibrated. That is, if there is a change in the nature of the boundary layer and the wall pressure fluctuations, then the Stanton tube will fail to provide dependable shear stress measurements.

In addition, the Stanton tube method of measuring shear stress can not discriminate between pressures that are uniform over a certain scale (size) and those that are uniquely related to shear stress. This is also true if the Stanton tube were modified by placing the pressure transducer at the opening though which flow generated pressure is detected.

Accordingly the measuring of wall shear stress, including fluctuating shear stress, is not a trivial matter.

As between uses of diaphragm pressure sensors, most such sensors are not easily transferred from use to use, are costly and often impractical.

Summary of the Invention

Disclosed in the parent application is a diaphragm transducer comprising a reflective diaphragm positioned across a chamber from an end face of an optic fiber. The diaphragm and the optic fiber are integrally mounted. The end face of the optic fiber serves as a local reference plane for the reflective diaphragm where a coherent source light beam is split by the fiber end. One part of the split beam illuminates the reflective diaphragm, and the other part of the split beam is locally reflected off the end face of the optic fiber back into the fiber. The beam part reflected off the diaphragm and the beam part locally reflected off the fiber end interfere with each other in the fiber. The phase difference between the two reflected beam parts is a function of the amount of deflection of the diaphragm. The interference of the two reflected beam parts creates a pattern indicative of the amount of deflection of the diaphragm and thereby the amount of sensed pressure. A light detector receives the interfering light pattern carried back in the fiber and produces a measurement of sensed pressure.

In the present invention, a single mode optic fiber is employed. The single mode fiber prevents the propagation of unwanted higher order modes found in multimode fibers. Although the single mode fiber provides varying degrees of light intensity corresponding to movement of the diaphragm through interference fringes, the fiber does not provide an interference pattern indicative of direction of diaphragm movement. Another embodiment of the present invention solves this problem by using two single mode optic fibers to provide a measurement of both magnitude and direction of deflection of the diaphragm.

In the two single mode optic fiber embodiment of the present invention, one fiber is centrally positioned relative to the reflective side of the diaphragm and the second fiber is positioned to one side of and facing the reflective side of the diaphragm. The centrally positioned fiber provides a source of coherent light and a local reference plane. Light from the fiber is split by the fiber end. Part of the split beam is reflected off the diaphragm and received by the same fiber end. The remaining part of the split light beam is locally reflected off the fiber end back into the fiber. The two reflected parts of the split light beam interfere with each other inside the fiber and form the interference pattern indicative of deformation of the diaphragm, and hence, the amount of pressure across the diaphragm.

The second optic fiber operates in a similar manner as the first optic fiber and produces an independent interference pattern indicative of diaphragm deflection. In particular, the two optic fibers establish two phase shifted signals. These signals are plotted with respect to each other to yield a closed loop Lissajous curve versus diaphragm deflection. A diaphragm moving toward the end faces of the optic fibers will result in travel in one direction around the Lissajous curve, while a diaphragm moving away from the end faces of the fibers will result in movement in an opposite direction. A magnitude measurement of the diaphragm displacement is obtained as before by counting fringes in the generated interference patterns.

In another embodiment of the present invention, the diaphragm transducer comprises an opening through which the chamber between a diaphragm and a fiber end communicates with the fluid flowing above and around the diaphragm. As fluid flows, an amount of pressure is produced at the opening. This pressure is higher than the ambient static pressure (if the opening faces the oncoming flow) and as a result causes the diaphragm to deflect. Further, pressure fluctuations at the opening are felt immediately on the side of the diaphragm facing the chamber and cause the diaphragm to deflect. Such deflection due to the detected pressure differentials is measured by means common in the art or by the interference pattern created by the split and reflected light beams from the optic fiber as described above for the single fiber device. A calibration of measured pressure versus shear stress as is common in the art is then used to provide a measurement of shear stress in the flowing fluid.

Further, pressure fluctuations of a scale larger than the nominal dimension of the diaphragm imposed by the flow are not "seen" by the device since these fluctuations are the same at the opening (and hence, at the chamber side of the diaphragm) as on the opposite side of the diaphragm, As a result, the diaphragm deflects only under pressure at the opening due to shear stress. Thus, the device of the present invention measures both the mean as well as the fluctuating shear stress in a target flow and is not affected by pressure fluctuations produced by means other than shear stress.

In addition, the present invention measures shear stress produced by flow in a forward as well as reverse direction. A reverse flow produces pressures of an opposite sign so that it is clear in which direction the shear stress is applied. This feature of the present invention is important in cases of separated flows and detection thereof.

In the sensors of the present invention, the diaphragm is supported by a substrate which separates the diaphragm from the fiber optic end and forms a well defined gap between the diaphragm and fiber optic end. Because the optic fiber, substrate and diaphragm are integrally attached to each other, the members do not move relative to each other due to movement of the assembly other than deflection of the diaphragm under an applied load. This eliminates the need for recalibration upon movement of the unit because the fiber end does not change position relative to the sensing diaphragm and the gap is unchanged. Also, optics of the unit are calibrated as a function of the gap.

In addition, the diaphragm and substrate are formed together as a single element. The element comprises silicon, but not necessarily, and is fabricated by micromachining techniques. Such techniques enable small dimensions of the diaphragm which in turn enable detection of very small pressure changes at a high frequency. Hence, the diaphragm has application in microphones, other acoustic pressure sensors, dynamic pressure systems and shear stress sensors.

Brief Description of the Drawings

The foregoing and other objects, features and advantages of the invention will be apparent in the following more particular description of the preferred embodiments of the invention, as illustrated in the accompanying drawings in which like reference characters refer to the same parts throughout different views. The drawings are not necessarily to scale, emphasis instead being placed on illustrating the principles of the invention.

FIG. 5 is a block diagram of a fringe counting output assembly for the embodiment of FIG. 2.

FIGS. 6*a* and 6*b* are schematic illustrations of mounting and assembly of the embodiment of FIG. 2.

FIG. 7 is a schematic view of a shear stress sensor embodiment of the present invention.

Detailed Description of the Preferred Embodiment

Figure 1B:
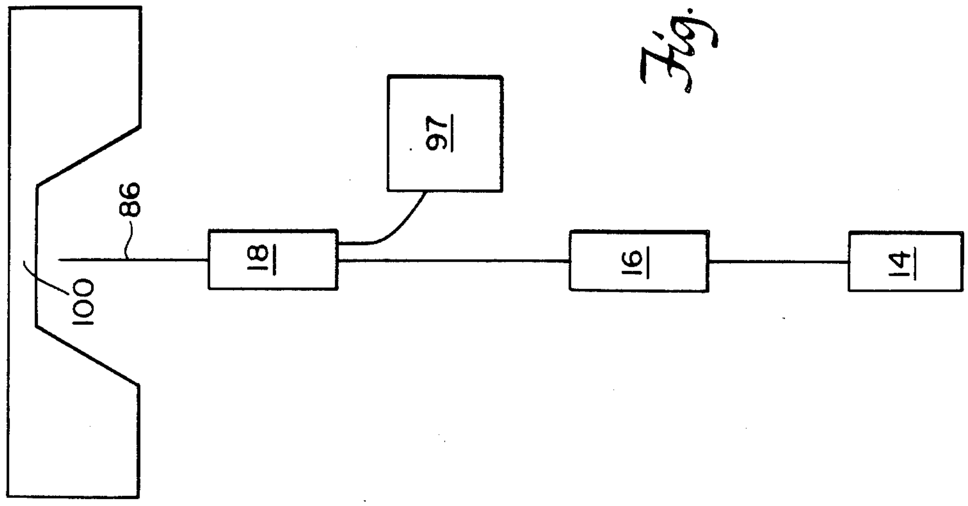
FIG. 1*b* is a schematic view of the embodiment of FIG. 1*a* coupled to a laser light source.
Figure 1A:
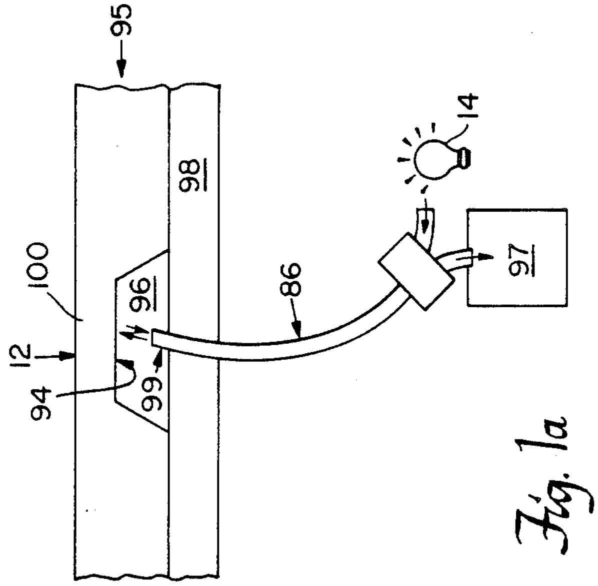
FIG. 1*a* is a schematic view of an embodiment of the present invention which utilizes a single mode optic fiber.

A general embodiment of the present invention is shown in FIG. 1*a*. Optic fiber 86 (or optionally a fiber bundle) is mounted to a support 98 with one end 99 of the fiber facing reflective diaphragm surface 94 of diaphragm 100. The diaphragm 100 is formed integrally with a substrate to form a diaphragm assembly 95. The diaphragm assembly 95 is attached to support 98 to form a defined gap 96 between the fiber end 99 and diaphragm 100. An adhesive or other form of bonding is used to attach the diaphragm assembly 95 to support 98 such that the diaphragm 100, fiber end 99 and support 98 form an integral unit.

Diaphragm 100 is responsive to a load applied across exposed side 12. A coherent light beam is carried by optic fiber 86 from a source 14 to fiber end 99. The delivered light beam is split by the fiber end 99 into two parts. One beam part is transmitted to reflective surface 94 of diaphragm 100 and consequently reflected therefrom in a direction toward fiber end 99. The second beam part is reflected at the edge of the face of fiber end 99 back into the fiber such that the fiber end 99 serves as a fixed local reference plane. The two reflected beam parts subsequently recombine within fiber end 99 and form an interference pattern indicative of the amount of deflection of diaphragm 100. This is due to the phase difference of the two reflected beams being a function of the amount of deflection of the diaphragm 100 and thereby the sensed pressure from the applied load.

A light detector 97 is coupled to the opposite end of fiber 86 and receives the interference pattern through that end. From the received interference pattern, the light detector 97 provides an indication of pressure sensed by diaphragm 100.

Preferably, fiber 86 is a single mode optic fiber so that only one mode of light is utilized throughout the pressure sensing device of FIG. 1*a*. Also, the source 14 is preferably a laser source which is coupled to fiber 86 through a laser-to-fiber coupler 16 as shown in FIG. 1*b*. The laser-to-fiber coupler 16 focuses a source laser beam into fiber 86 according to diameter of the fiber. The fiber 86 is also coupled through a 50/50 coupler 18 near the light delivering (or diaphragm facing) end of the fiber. Thus, light carried in the fiber 86 from the source 14 and through coupler 16 is split 50/50 with respect to intensity at the coupler 18. Hence, fifty percent of the intensity of the original light is carried to fiber end 99, and fiber end 99 splits that fifty percent of the original light into two beam parts for detecting diaphragm deflection.

Further, Applicants have found that fiber end 99 does not necessarily equally split the light carried to that end. In particular, a percentage (about four percent) of the light intensity is locally reflected by fiber end 99. In turn, diaphragm 100 is made sufficiently thin such that about the same percent of the intensity of the transmitted beam part is reflected from diaphragm surface 94. The substantially matching intensities of the reflected beam parts provide proper cancellation and intensification upon recombination of the two beam parts. As a result, an accurate interference pattern (i.e. a sine wave of light intensity) indicative of diaphragm deflection is formed within fiber 86.

During the return travel of the recombined beam parts through fiber 86, the fiber serves primarily to carry the correct intensity of light back to detector 97. The returned recombined light is split 50/50 at the coupler 18 such that light detector 97 receives an intensity of light of about half of the recombined light intensity at fiber end 99. Interpretation of the interference pattern (i.e. fringe pattern) received by detector 97 is than as disclosed in the parent application.

Figure 2:
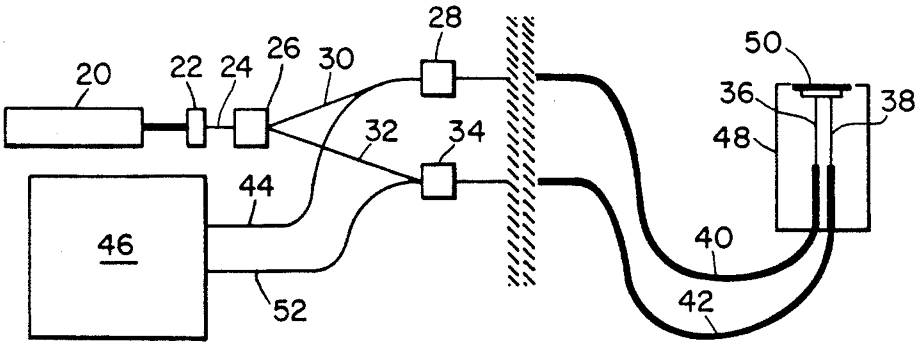
FIG. 2 is a schematic view of another embodiment of the present invention with two optic fibers for detection of magnitude and direction of diaphragm deflection.

In another embodiment of the present invention, a measurement of direction of diaphragm deflection relative to the support 98 is provided in addition to a magnitude measurement as provided by the embodiment of FIGS. 1*a* and 1*b*. A twin fiber embodiment of the present invention for providing both a magnitude and direction measurement of diaphragm deflection is illustrated in FIG. 2 described next.

A laser source 20 provides coherent light which is coupled into a single mode optic fiber 24 by a laser-to-fiber coupler 22. The fiber 24 carries the coherent light to a first 50/50 fiber-to-fiber coupler 26 which equally splits the light into two forward traveling legs 30 and 32. Each leg 30, 32 carries a respective beam part through a respective fiber-to-fiber coupler 28, 34 toward the diaphragm and provides an independent interferometer configuration with the diaphragm similar to that described in FIG. 1*b*.

Specifically, each leg 30, 32 has its respective laser light split at fiber-to-fiber coupler 28, 34 respectively. One part of the split light at coupler 28 travels forward to the head end 36 of fiber 40, while at coupler 34 one part of the split light travels to the head end 38 of fiber 42. Fiber ends 36, 38 are cleaved perpendicular to the direction of light propagation such that each fiber end 36, 38 forms an independent interference cavity with the diaphragm 50. The reference beam part locally reflected from the face of fiber end 36 and the emitted beam part subsequently reflected off the diaphragm surface interfere with each other and propagate back along fiber 40. Likewise, the locally reflected beam part from the face of fiber end 38 and its subsequently diaphragm reflected beam part interfere with each other and propagate back along fiber 42. The returning interfering light in fibers 40 and 42 are split at fiber-to-fiber couplers 28 and 34 respectively. Returning portions of light from couplers 28 and 34 are carried in channels 44 and 52 respectively to detection electronics 46, where the independent interference patterns indicative of diaphragm deflection are analyzed.

In general, because of slight length differences between fibers 40 and 42, the cavity between fiber end 36 and the diaphragm 50 has a different path length than that of the cavity between fiber end 38 and diaphragm 50. Hence, the respective interference patterns generated in the two fibers 40 and 42 are shifted in phase from one another. However, if the diaphragm 50 is deflected by pressure, the total path length of the cavity between one fiber and the diaphragm changes identically to that of the cavity between the other fiber end and the diaphragm. The curve (i.e., graphical representation) of each fiber interference output versus cavity length with respect to diaphragm 50 can be described by its own Airy function, which may be approximated as a sinusoid for most values of reflectivity. In turn, the graphed or plotted curves of diaphragm deflection give two phase-shifted signals, as shown schematically in FIG. 3. The upper sine wave is the detector output of the interference pattern received through channel 44 and the lower sine wave is the detector output for the interference pattern of channel 52. Plotting the output for channel 44 versus that of channel 52 yields a closed loop Lissajous curve as illustrated in FIG. 4. When diaphragm 50 moves toward the faces of fiber ends 36 and 38, the detector output will result in travel in one direction around the Lissajous curve, while diaphragm movement away from faces of the fiber ends 36, 38 will result in detector output travelling in the opposite direction.

The outputs of channels 44 and 52 also serve as inputs to a fringe counting circuit which automatically counts down or up depending on whether the cavity between diaphragm 50 and the fiber ends 36 and 38 is getting larger or smaller. A two bit binary description of the diaphragm displacement may be obtained by setting trigger levels on the Lissajous curve as shown by the dotted lines in FIG. 4. As long as the curve remains outside the cross-hatched box defined by the upper (UTL) and lower (LTL) transition levels of each channel, the circuit will be able to correctly measure the magnitude and direction of diaphragm displacement. This detection method has a resolution of about one-eighth the wavelength of laser light (−80 nm).

Figure 3:
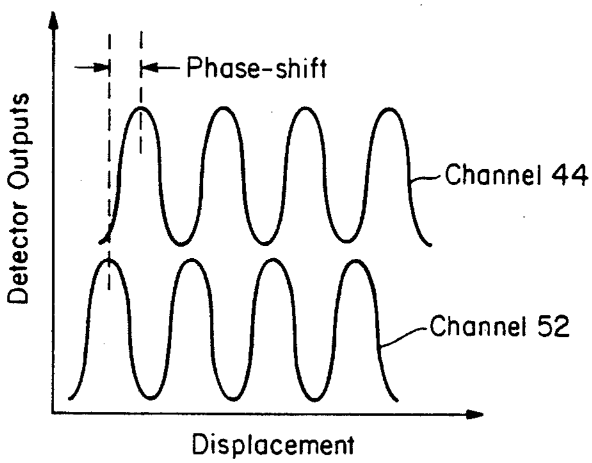
FIG. 3 is a graph of the output of the two fibers in the embodiment of FIG. 2.
Figure 4:
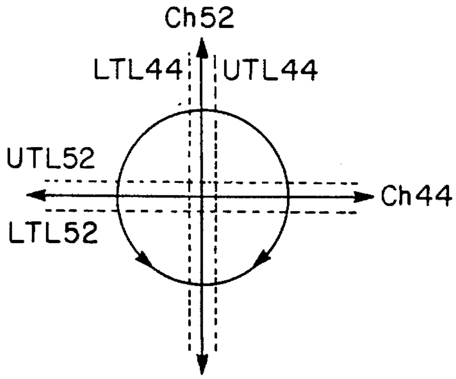
FIG. 4. is a Lissajous curve formed from the output of the embodiment of FIG. 2 for providing direction of detected diaphragm deflection.

In particular, to perform the task of decoding the optical signals from channels 44 and 52, the present invention employs fringe counting and computer interface circuitry illustrated in FIG. 3. The circuitry is used to amplify the received signals, remove noise, decode the results into up/down counts, and to send the digital information to a computer. The diaphragm displacement measurement in interference fringes, can then be correlated to a pressure reading in real time. First, the signals from photo detectors of the detection electronics 46 are amplified and any DC offsets are removed. These amplified signals are fed to voltage comparitors with adjustable transition levels in circuit part 66. Noise discrimination logic 56 next allows the signal to drift repeatedly across any one of the transition levels without triggering a counter 54. The counter 54 is only triggered when a signal of a channel 44 or 52 has crossed both upper and lower transition levels of that channel as shown in FIG. 4.

Combinational logic 58 follows noise discrimination logic 56 and is used to determine counter trigger and counter direction, both of which depend on the relationship between the previous and present binary states of the system. This information is sent to on-board displays 60 and to the digital I/O port of the interface unit 62 which is connected to a computer 64, for example, an IBM PC/AT. Software performs data acquisition, analysis and display routines within the computer 64. Sensor calibration data (fringes vs. pressure) is recorded and stored on disk.

Fabrication and assembly of the twin fiber system of FIG. 2 is as follows. Diaphragm 50 is fabricated of silicon using standard anisotropic etching techniques on double-side polished (100) wafers. In particular, square diaphragms of two millimeters on a side and sixty microns thick are fabricated in a temperature controlled potassium hydroxide (KOH) etching apparatus. Various alcohols are added to the solution to achieve more uniform etching. Isotropic polishing etches are used to smooth out the reflective diaphragm surface (i.e. the surface facing the fiber ends) for reflective purposes. To prevent surface roughness from impairing sensor operation, the diaphragm is made from silicon wafer with sixty microns of epitaxial silicon deposited on the wafer. Using known anodic etch stop techniques, a very smooth surface of reflective silicon for deflection is obtained.

The choice of diaphragm material is not restricted to silicon. Any partially reflecting surface can serve as the diaphragm reflecting surface; for example polished stainless steel diaphragms are suitable.

A sensor head assembly 48 formed of fiber ends 36 and 38 and diaphragm 50 as shown in FIG. 2 is machined in a ⅜-18 bolt 74 as shown in FIG. *6a*. Since alignment of the exposed side of diaphragm 50 with the top surface 76 of a target is critical for certain load transfer schemes (e.g. load transfer through an elastomer in composite manufactured tools), the threads of the bolt 74 are left loose and set screws 76 are provided between groups of threads of the bolt. Fine adjustment alignment screws 68 through opposite sides of the bolt head attach bolt 74 to a subject (e.g. underside of a target surface) and also aid in diaphragm 50 alignment with target surface 72.

A mounting channel 78 adapted to receive a fiber holder assembly 70 with fiber ends 36 and 38 lies along the central longitudinal axis of bolt 74. A close-up of the fiber holder assembly 70 is shown in FIG. *6b*. The optic fibers 40 and 42 have their respective ends 36 and 38 stripped of the jackets encasing them. The stripped fiber ends 36 and 38 are held in a ceramic holder with two respective 125 micron diameter bores which match the diameter of the glass cladding of the stripped fiber ends 40, 42. The ceramic holder 75 is surrounded by a cylinder of hypodermic steel tubing 77 for ruggedness. This steel tubing 77 is passed through the mounting channel 78 in the bolt 74 and is aligned geometrically normal to the diaphragm 50 through the use of set screws 76.

When the fiber ends 36, 38 are properly aligned, sensor operation is easily achieved. At high temperature use, only the diaphragm, optical fibers and mounting hardware are exposed to the hostile environment. The detection circuitry is kept at or near room temperature. In addition, glass fiber with a silicone/teflon jacket is currently available and can withstand temperatures beyond 200 degrees celsius. If the jacket is removed, the stripped fiber may be able to withstand even higher temperatures as mounted in the disclosed fiber holder assembly of FIG. *6b*. Further, the interference of light is intrinsically insensitive to high temperature; and since the interference cavity (i.e. the cavity between the fiber ends 36 and 38 and diaphragm 50) is highly localized, temperature effects on the fiber ends 36 and 38 have little effect on the light intensity carried back through fibers 40 and 42 to the detection electronics 46.

The foregoing twin fiber embodiment of the present invention (a twin interferometer system) provides detection of both the direction and magnitude of deflection of a diaphragm. However, the basic interferometer techniques involved in the foregoing are also understood to be applicable to other mechanical sensors in which deflections must be monitored, for example shear stress sensors. The basic interferometer techniques of the present invention which are applicable include (i) carrying light forward to a diaphragm and backward to photodetectors in a single fiber, and (ii) using the face of a cleaved end of a fiber as the reference plane for the interference cavity, where cavity length changes by deflection of the diaphragm, thus changing interference of the light propagating back to the photodetectors.

An embodiment of the present invention which provides a shear stress measuring device is illustrated in FIG. 7. A diaphragm 84 is fabricated in a diaphragm assembly 80. The diaphragm assembly 80 is connected to an optic fiber assembly in a manner which spaces the end face of an optic fiber 82 across a cavity 81 from a reflective surface of diaphragm 84. An opening 86 is provided in the diaphragm assembly 80 to provide communication between the cavity 81 and the external fluid above and around the diaphragm 84.

The device is positioned in a target flow area in a manner which allows diaphragm assembly 80 to protrude a small distance above the target surface 79 over which fluid flows and on which shear stress is to be determined. Also, opening 86 faces upstream, that is, into the flowing fluid.

It is well established that provided the height H (FIG. 7) of protrusion of the diaphragm 84 above the target surface 79 is within certain bounds, the flow of fluid separates ahead of the diaphragm 84 at a position S. As a result of this type of flow, the action of shear stress $\tau_w$ on the fluid below the dotted line produces a pressure at the forward face (wall 88) of the protruding diaphragm assembly 80. This pressure is higher than the ambient static pressure and as a result causes the diaphragm 84 to deflect.

Light from a coherent light source is carried by optic fiber 82 to the reflective underside surface of diaphragm 84. The source light beam is split by the end of fiber 82 which faces the reflective diaphragm surface. The split beam forms two parts, a locally reflected part and an emitted part as described previously in the embodiments of FIGS. *1a* and 2. The locally reflected part is reflected off the end of the fiber 82 back into the fiber. The emitted part illuminates the diaphragm reflective surface across the cavity 81. The diaphragm reflective surface reflects the illuminating light back across cavity 81 and into the fiber end to interfere with the locally reflected beam part. The interference of light forms a light wave in fiber 82 which is indicative of diaphragm deflection. The interference light is carried back through fiber 82 to light detection-readout circuitry such as that previously described in FIGS. 1*a* and 2.

It is understood that measurement of diaphragm deflection and hence detected pressure may be obtained by other means known in the art such as capacitively or with piezoresistive material on the diaphragm.

By means common in the art, such as Preston tubes or Stanton tubes and related pressure curves, the detected pressure is calibrated with respect to shear stress $\tau_w$. This calibration is then used to measure the shear stress in any type of flow of interest.

The foregoing shear stress measuring device of the present invention provides the following advantages over prior art shear stress measuring devices.

1. The present shear stress measuring device is able to measure both the mean and fluctuating shear stress because of its potentially small size formed by microfabrication techniques and the very small volume between the upstream opening 86 of the device and the cavity 81 within the device. In other words, pressure fluctuations at the opening 86 are felt immediately on the underside of diaphragm 84. Hence diaphragm deflection is in a timely manner which enables accurate measurement of fluctuating shear stress.

2. Pressure fluctuations of scale E shown in FIG. 7, imposed by fluid flow on the target surface 79 are not seen by the device since these fluctuations are the same at the opening 86 (and hence, below the diaphragm 84) as above the diaphragm 84. Thus in the instances where pressure fluctuations are of scale E, the diaphragm 84 acts as a differential pressure transducer with static pressure being the same on both sides of the diaphragm 84. Deflection of the diaphragm 84 is then only under pressure generated at the opening 86 due to shear stress $\tau_w$. Hence the device of the present invention discriminates between pressures uniformly over a scale E and those uniquely related to shear stress.

3. The present device eliminates the generation of a pumping force on the detecting pressure (i.e. diaphragm) transducer by omitting the transfer of pressure from the target area to a remote position and the asymmetries involved in such transfers. Pressure detection by a diaphragm transducer in the present invention is at the target site (i.e. at the subject surface in the target flow).

4. The present device measures shear stress produced by the flow in either direction (i.e. from left to right or vice versa in FIG. 7) along target surface 79. Flow in one direction produces pressure measurements of one sign. And flow in a reverse direction produces pressures of the opposite sign. To that end, direction in which shear stress is applied can be detected. This property of the device is important to detect separated flows or in various uses of separated flows.

Alternatively stated, the present invention provides a shear force sensing device which detects shear based on the difference between pressure felt at a wall (wall 88) facing into an oncoming target flow and pressure felt on a surface (i.e. exposed surface of diaphragm 84) orthogonal to the wall. The pressure at the upstream facing wall is pressure due to both shear and surrounding pressures. The pressure at the exposed diaphragm surface is due to just the surrounding pressures. Hence, the difference between these two pressures is the shear stress produced by the target flow.

Using the foregoing principles, another shear force sensing device of the present invention employs two diaphragm pressure transducers. One diaphragm pressure transducer is positioned with the exposed surface of the diaphragm transverse to the general direction of fluid flow of interest. The second diaphragm pressure transducer is positioned with its exposed surface orthogonal to the exposed surface of the first diaphragm transducer. A measurement of pressure, which is due to both shear and surrounding pressures, is obtained by common means from a measurement of diaphragm deflection of the first diaphragm transducer. Also by common means, a measurement of pressure, that is due to surrounding pressures, is obtained from a measurement of diaphragm deflection of the second transducer. A difference of the two pressure measurements provides a measurement that is directly related to shear stress.

While the invention has been particularly shown and described with reference to preferred embodiments thereof, it will be understood by those skilled in the art that there are changes in form and detail that may be made without departing from the spirit and scope of the invention as defined in the appended claims.

We claim:

1. A pressure transducer comprising:

a diaphragm;

a source of coherent light;

an optic fiber assembly coupled to the diaphragm and having at least one single mode optic fiber with an end facing the diaphragm and an opposite end coupled to the source for receiving coherent light, the fiber end facing the diaphragm being fixed across a gap therefrom and splitting a coherent light beam carried by the fiber into a transmitted part and a reference part, the transmitted part being emitted from the fiber end across the gap to the diaphragm and reflected therefrom back to the fiber end, the reference part being formed by locally reflecting off the fiber end in a direction back through the fiber, the transmitted part after being reflected off the diaphragm intersecting the reference part at the fiber end, the intersection of parts forming an interference light wave indicative of diaphragm deflection and carried by the fiber in a direction away from the fixed fiber end; and detection means including light detecting means, coupled to the fiber for receiving the interference light wave, and the detection means providing an indication of diaphragm deflection.

2. A pressure transducer as claimed in claim 1 wherein the optic fiber assembly is coupled to the diaphragm in a manner which provides through an opening, communication between the gap and area surrounding the diaphragm where forces to which the diaphragm is subjected exist;

the detection means further providing a measurement of shear stress from the sensed diaphragm deflection.

3. A pressure transducer as claimed in claim 1 wherein the optic fiber assembly comprises a second single mode optic fiber with one end facing the diaphragm and fixed across a cavity from the diaphragm, and an opposite end coupled to the source for receiving coherent light, the one end of the second fiber splitting a coherent light beam carried by the second fiber in a manner substantially similar to the diaphragm facing end of the first fiber splitting coherent light carried by the first fiber such that the second fiber carries from its one end to the light detecting means an interference light wave indicative of diaphragm deflection, the interference light wave of the second fiber being independent of the interference light wave of the first fiber, and the light detecting means being coupled to the first and second fibers for receiving respective interference light waves from the two fibers and therefrom the detection means providing measurements of magnitude and direction of diaphragm deflection.

4. A pressure transducer as claimed in claim 3 wherein the detecting means further include curve plotting means for plotting a closed loop Lissajous curve from the interference light waves received from the first and second optic fibers, direction of travel around the curve providing the direction of diaphragm deflection.

5. A pressure transducer as claimed in claim 3 wherein the detecting means further include a counting assembly for counting fringes in the received interference light waves to provide magnitude measurements of diaphragm deflection.

6. A pressure transducer comprising:

a diaphragm;

a first optic fiber and a second optic fiber, each optic fiber having a fixed end facing the diaphragm across a gap, the fixed ends and the diaphragm being integrally mounted to form a unit, the fixed end of the first fiber splitting coherent light carried by the first fiber into a reference part and a transmitted part, the reference part being locally reflected off the end of the first fiber and into the first fiber, and the transmitted part being reflected off the diaphragm across the gap into the first fiber to interfere with the locally reflected reference part in the first fiber end, the interference forming a light wave indicative of diaphragm deflection;

the fixed end of the second fiber splitting coherent light carried by the second fiber into a local reference part and a diaphragm reflected part, respectively similar to the reference part and transmitted part of the first fiber, which interfere in the fixed end of the second fiber to form therein a light wave indicative of diaphragm deflection similar to the light wave formed in the first fiber but shifted in phase;

detection means coupled to the first and second optical fibers for receiving the formed light waves and providing an indication of magnitude and direction of diaphragm deflection.

* * * * *

UNITED STATES PATENT AND TRADEMARK OFFICE

CERTIFICATE OF CORRECTION

PATENT NO. : 4,942,767

DATED : July 24, 1990

INVENTOR(S) : Joseph H. Haritonidis, Stephen D. Senturia, David J. Warkentin and Mehran Mehregany It is certified that error appears in the above-identified patent and that said Letters Patent is hereby corrected as shown below:

Col. 1 line 9 before "Background of the Invention" insert

This invention was made with government support under contract Number N00014-87-K-0048 awarded by the U.S. Department of the Navy. The government has certain rights in the invention.---

Signed and Sealed this

Eighth Day of December, 1992

Attest:

DOUGLAS B. COMER

*Attesting Officer*

*Acting Commissioner of Patents and Trademarks*